(12) United States Patent
Gralto

(10) Patent No.: US 9,789,813 B2
(45) Date of Patent: Oct. 17, 2017

(54) VEHICLE SAFETY ALERT SYSTEM

(71) Applicant: Anthony Gralto, Syosset, NY (US)

(72) Inventor: Anthony Gralto, Syosset, NY (US)

( * ) Notice: Subject to any disclaimer, the term of this patent is extended or adjusted under 35 U.S.C. 154(b) by 0 days.

(21) Appl. No.: 14/721,202

(22) Filed: May 26, 2015

(65) Prior Publication Data

US 2016/0347241 A1    Dec. 1, 2016

(51) Int. Cl.
| | |
|---|---|
| *G08G 1/052* | (2006.01) |
| *B60Q 1/50* | (2006.01) |
| *G08G 1/01* | (2006.01) |
| *B60Q 9/00* | (2006.01) |
| *B60W 40/105* | (2012.01) |
| *G06Q 50/30* | (2012.01) |
| *G06Q 90/00* | (2006.01) |
| *G08B 25/00* | (2006.01) |
| *G07C 5/00* | (2006.01) |
| *G08G 1/0967* | (2006.01) |
| *G08G 1/0962* | (2006.01) |
| *B60K 31/18* | (2006.01) |
| *B60Q 1/26* | (2006.01) |

(52) U.S. Cl.
CPC ............. *B60Q 1/50* (2013.01); *B60Q 9/00* (2013.01); *B60W 40/105* (2013.01); *G06Q 50/30* (2013.01); *G06Q 90/00* (2013.01); *G07C 5/008* (2013.01); *G08B 25/00* (2013.01); *G08G 1/0116* (2013.01); *G08G 1/052* (2013.01); *G08G 1/0967* (2013.01); *G08G 1/09626* (2013.01); *B60K 31/18* (2013.01); *B60Q 1/268* (2013.01); *G08G 1/0962* (2013.01); *G08G 1/096783* (2013.01)

(58) Field of Classification Search
CPC ...... G08G 1/01; G08G 1/0145; G08G 1/0116; G08G 1/052; G08G 1/207; G08G 1/0141; G08G 1/08; G08G 1/0962; G08G 1/0967; G08G 1/096708; G08G 1/096716; G08G 1/09675; G08G 1/096725; G08G 1/096758; G08G 1/096783
USPC ............ 340/425.5, 438, 441, 905, 933, 936; 701/117
See application file for complete search history.

(56) References Cited

U.S. PATENT DOCUMENTS

| | | | |
|---|---|---|---|
| 6,037,861 A | 3/2000 | Ying | |
| 8,188,887 B2 * | 5/2012 | Catten | G06F 17/30241 340/425.5 |
| 8,344,864 B1 * | 1/2013 | Al-Mutawa | B60W 50/12 340/435 |
| 8,612,131 B2 | 12/2013 | Gutierrez et al. | |

(Continued)

*Primary Examiner* — Benyam Haile
(74) *Attorney, Agent, or Firm* — Global Intellectual Property Agency, LLC; Daniel Boudwin

(57) ABSTRACT

A vehicle safety alert system. The system includes a controller disposed within a vehicle and a plurality of transmitters disposed along a roadway. The controller receives speed limit data from the transmitters and then both notifies a driver of the current speed limit and alerts the driver if the vehicle exceeds the speed limit. The controller also includes GPS components and is configured to upload vehicle location data to a database and server via an existing network. The transmitters are configured to receive vehicle speed and identification information and relay the information to a server. The information regarding vehicle speed, location, and identification is then sent from the database to the appropriate monitoring agency via the server.

12 Claims, 4 Drawing Sheets

(56) References Cited

U.S. PATENT DOCUMENTS

| | | | |
|---|---|---|---|
| 2013/0038461 A1* | 2/2013 | Hawkes | G08G 1/07 340/815.4 |
| 2013/0049990 A1 | 2/2013 | Shi et al. | |
| 2015/0006067 A1* | 1/2015 | Lees | H04W 4/008 701/118 |
| 2015/0039214 A1* | 2/2015 | McClellan | G01S 5/0027 701/119 |

\* cited by examiner

VEHICLE SAFETY ALERT SYSTEM

FIELD OF THE INVENTION

The present invention relates to traffic safety systems. More specifically, the present invention relates to systems for monitoring driver behavior and enhancing driver and pedestrian safety.

BACKGROUND OF THE INVENTION

Traffic accidents are an ever-present risk for motorists and pedestrians alike. Pedestrians are particularly vulnerable to fast moving vehicles. One way to increase driver and pedestrian safety is to post a speed limit. However, many drivers fail to comply with posted speed limits. This can be particularly dangerous in school zones, hospital zones, residential areas, and other areas where pedestrians are more likely to be present in the roadway. It is important to reduce the risk of traffic accidents in order to improve overall road safety and reduce the risk of death and injury to motorists and pedestrians.

One way of lowering the risk of a traffic accidents in areas of high pedestrian activity is to post a greatly reduced speed limit. However, drivers are not always aware of the speed limit on particular roads, due to a long stretch of road without a posted speed limit, a general lack of awareness by the drivers, or such causes. If a driver is not aware of what the speed limit on a given stretch of road is, then they may travel at an unsafe speed. It is therefore desirable to provide a system that notifies drivers of the speed limit of the particular section of roadway through which the driver is traveling.

In some areas, the speed limits on roads may change abruptly. For example, a state highway or county road may have a posted speed limit of 55 MPH. When that road passes through a residential neighborhood, school zone, or other area populated with pedestrians, the posted speed limit may drop suddenly to a lower limit, such as 25 MPH. A distracted driver may not be aware of the changing speed limit and unintentionally operate a vehicle at an unsafe speed in excess of the legal limit, which increases the risk of vehicle accidents involving pedestrians. An alert system that notifies a driver when their vehicle is traveling in excess of the legal speed limit is therefore desired.

While a system that provides an alert to a driver traveling above the posted speed limit will be sufficient for users who are unintentionally speeding, it will not discourage a driver who is intentionally speeding from doing so. Some drivers choose to continue to speed regardless of the posted limit. Currently, drivers may only be discouraged from speeding if they see a police officer while driving, due to the possibility of receiving a speeding ticket. However, police and other agencies are only able to monitor a small fraction of roadways at any given time. The threat of a speeding ticket alone may not be enough of a deterrent to discourage drivers from traveling faster than the posted speed limit. There is need for a system that actively monitors vehicle speed and, if the driver chooses to travel at a speed that is greatly in excess of the posted speed limit, automatically transmits the driver's location and speed information to the appropriate authority. Using such a system will lessen the need for a constant police presence along roadways and will further increase safety for pedestrians by discouraging drivers from speeding through reduced speed limit zones.

SUMMARY OF THE INVENTION

In view of the foregoing disadvantages inherent in the known types of vehicle monitoring systems now present in the prior art, the present invention provides a system for monitoring driver performance wherein the same can be utilized for providing information to proper authorities in order to encourage safe driving habits.

One object of the present invention is to provide a safety alert system that includes a controller integral to a vehicle, the controller comprises a power supply, a data storage, one or more sensors in communication with the mechanical and electrical systems of the vehicle, and a first wireless transceiver, the controller in wireless communication with a communications network; a transmitter comprising a second wireless transceiver in communication with said controller, the transmitter in further communication with the communications network via a server; and a database in communication with the server and adapted to store information received from the first and second transmitters.

Another object of the present invention is to provide a safety alert system that includes a controller that can be attached to the interior of a vehicle to provide speed limit information to a driver and to warn the driver when the vehicle speed exceeds the posted speed limit.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
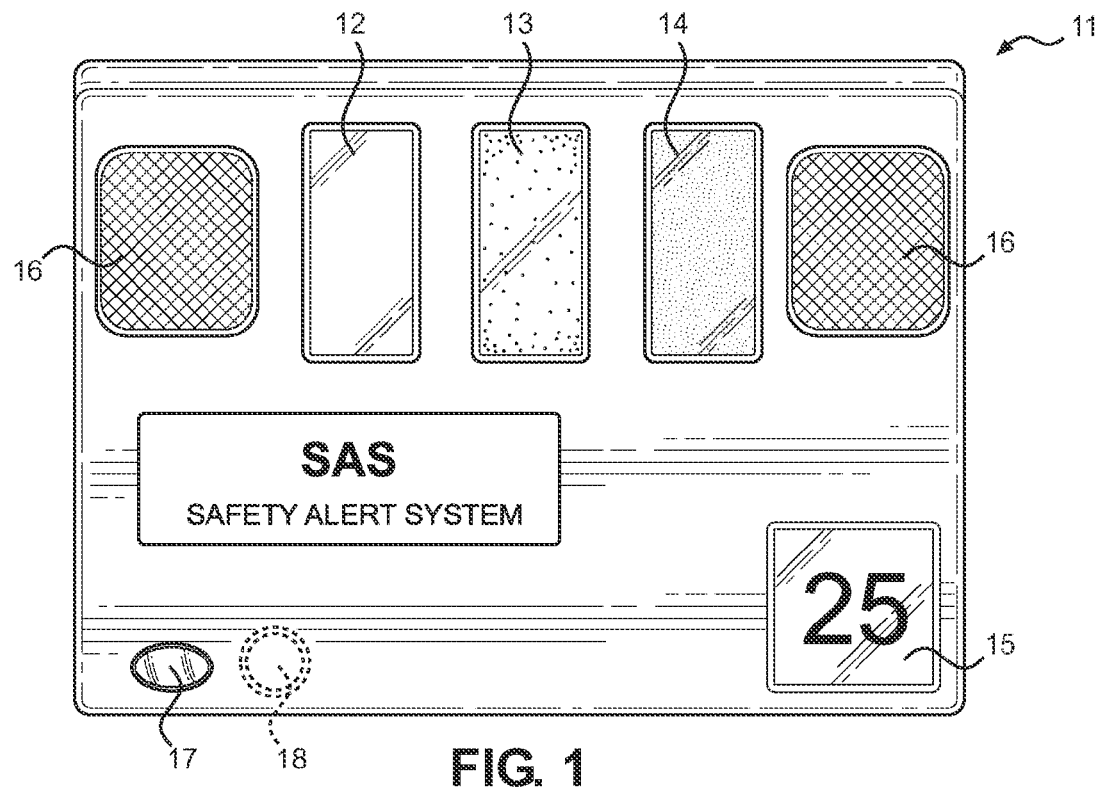
FIG. 1 shows a front view of an exemplary embodiment of the controller of the safety alert system.

Reference is made herein to the attached drawings. Like reference numerals are used throughout the drawings to depict like or similar elements of the vehicle safety alert system. For the purposes of presenting a brief and clear description of the present invention, the preferred embodiment will be discussed as used for a system adapted to alert drivers when they are proceeding at speeds above the posted limits and if the driver persists in proceeding above the posted speed limit, notifies the relevant authorities so that a citation can be issued. The figures are intended for representative purposes only and should not be considered to be limiting in any respect.

The present system is adapted to detect the speed limit for the stretch of road on which a vehicle is driving and monitor the speed of the vehicle to determine if the vehicle exceeds the given speed limit. The present system comprises an electronic device or controller disposed within a vehicle that provides drivers with audio and/or visual cues as to the speed of the vehicle relative to the given speed limit. The controller wirelessly communicates with a series of transmitters disposed along a roadway to relay the position of the vehicle and download the speed limit for the given stretch of roadway. As used herein, "roadway" refers to any paved thoroughfare, such as a highway. As the vehicle travels down the roadway, the controller successively connects to each transmitter to which it is in proximity in order to update the position of the vehicle with the system and continuously download the speed limit associated for the location corresponding to each transmitter. The controller monitors the speed of the vehicle via direct communication with the vehicle's on-board electronic systems, GPS, or detecting the amount of time taken to pass from transmitter to transmitter. The transmitters are grouped in sections, delineating stretches of the roadway in which the speed of the vehicle carrying the controller is tracked. When outside the range of a section of the transmitters, the vehicle is not tracked by the present system.

Referring now to FIG. 1, a front view of an exemplary embodiment of the controller 11 of the safety alert system is shown. The controller 11 is adapted to be placed within the interior of a vehicle, such as attached to the inner surface of the front windshield. In one embodiment of the present system, the controller 11 is integral to the vehicle. In another embodiment of the present system, the controller 11 is removably attachable to the interior of the vehicle. A digital display 15 is disposed on the front surface of the controller 11. The digital display 15 shows the speed limit of a particular section of road over which the vehicle is traveling. One or more speakers 16 are disposed along the front surface of the device. The speakers 16 emit a warning sound when the user travels above a threshold speed value for a sustained period of time. The threshold speed can be programmed to be equal to a given speed limit for the section of road or above the given speed limit. The length of time which the user is required to be travelling above this threshold to trigger the present system is also programmable.

In addition to the auditory warning provided by the speakers 16, the controller 11 further comprises indicator lights 12, 13, 14 to provide the driver with visual cues as to the current speed of the vehicle relative to the speed limit for the given stretch of road. In an illustrative embodiment of the present system, the controller 11 comprises three indicator lights: a first indicator light 12 comprising a green color, a second indicator light 13 comprising a yellow color, and a third indicator light 14 comprising a red color. The colors of the indicator lights 12, 13, 14 in the illustrative embodiment imitate a traffic light and tend to gain the attention of a driver, but no claim is made as to a specific color scheme. A first indicator light 12 remains continuously illuminated while a user is traveling at or below the posted speed limit within the range of one or more of the transmitters. If a user exceeds the posted speed limit, the first indicator light 12 deactivates and a second indicator light 13 illuminates. An accompanying warning sound may be played through the speakers 15 when the second indicator light 13 is illuminated. The second indicator light 13 remains illuminated until the driver reduces the vehicle speed to a rate lower than the posted limit. If the driver continues traveling over the posted speed limit for a sustained period of time or if the driver greatly exceeds the posted speed limit, then the third indicator light 14 will illuminate.

The controller 11 is powered by a power source 18, such as a battery, disposed within the controller 11. A battery indicator light 17 illuminates when the battery 18 runs low. The color of the indicator lights may vary but are preferably such that they gain the attention of the driver. The location of the various indicator lights, speakers, and the digital display screen may also be varied in order to provide maximum visibility to a driver.

Figure 2:
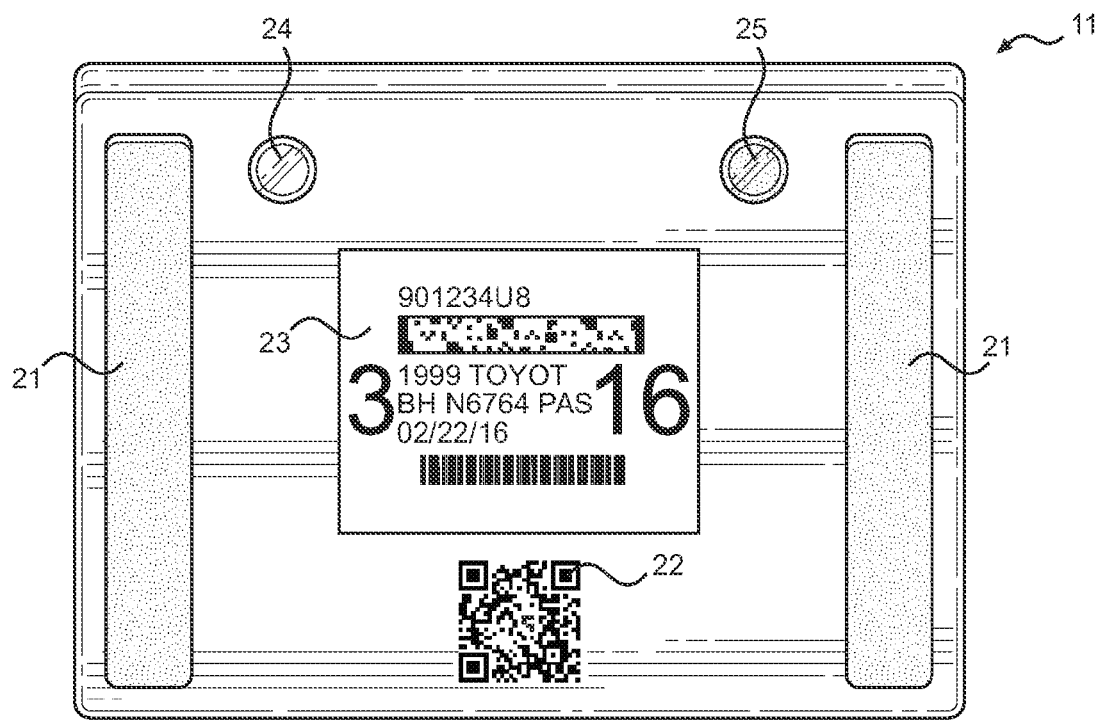
FIG. 2 shows a rear view of an exemplary embodiment of the controller of the safety alert system.

Referring now to FIG. 2, the rear side of an exemplary embodiment of the controller 11 is shown. The controller 11 is attachable to a surface via two attachment points 21. The attachment points 21 comprise adhesives, hook-and-loop fasteners, or other fasteners or connectors that allow the connector 11 to be affixed to a surface. In one embodiment, the controller 11 is attachable to a windshield of a vehicle in order to provide maximum visibility of both the road and the controller 11 for the driver. The rear side of the controller 11 also includes vehicle identification information 23. The vehicle identification information 23 may include information relating to vehicle registration, insurance information, or other information regarding the vehicle. A barcode 22 is disposed on the rear surface of the controller 11 that allows the vehicle identification information 23 to be obtained using a barcode scanner or similar device. In one embodiment of the present system, the controller 11 can comprise a vehicle's state inspection sticker and the registration. In this embodiment, the controller 11 may replace the traditional inspection sticker and registration papers.

A number of indicator lights are also disposed on the rear surface of the controller 11. A first indicator light 24 illuminates when there are no present violations relating to the vehicle and/or driver to which the controller 11 is paired. A second indicator light 25 illuminates when there is a current or outstanding violation related to the vehicle to which the controller 11 is connected, such as a speeding fine or a lack of vehicle insurance.

Figure 3:
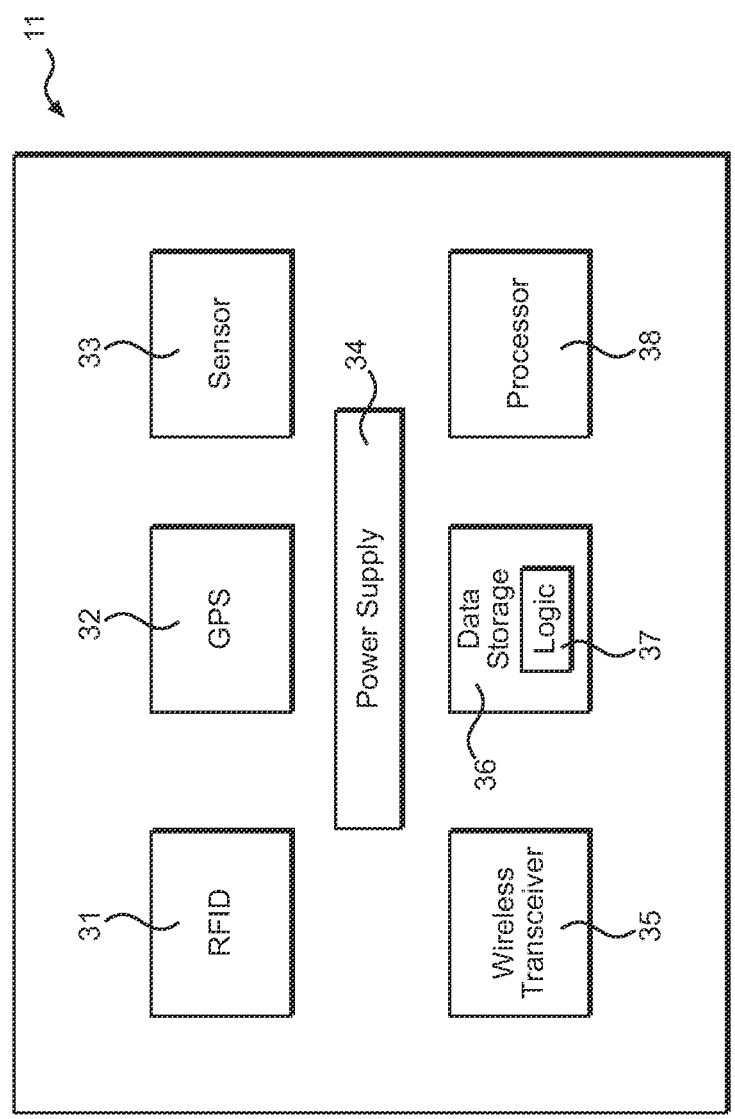
FIG. 3 shows a diagram of the electronic components of the controller of the safety alert system.

Referring now to FIG. 3, a diagram of the electronic components of the controller 11 is shown. The controller comprises a number of systems in operable communication with a processor 38 that carries out the various functions of the controller 11. The controller comprises an RFID chip 31 that either passively or actively emits an identifying signal unique to the particular controller 11 from which it is emitted. The controller 11 further includes a GPS system, including a GPS receiver 32, that uses satellite signals to determine the location of the vehicle in which the controller 11 is disposed.

The controller 11 includes one or more sensors 33 that are operatively coupled to and in communication with a number of vehicle systems for the purpose of monitoring the vehicle. The controller 11 is adapted to monitor vehicle speed via the sensor 33. In one embodiment of the present system, the sensor 33 is wirelessly connectable to the vehicle's on-board computer system and adapted to detect and monitor the speed of the vehicle therefrom. Alternatively, the controller may utilize the GPS receiver 32 to determine the speed of the vehicle. The controller is powered by a power supply 34. The controller 11 further comprises a wireless transceiver 35 that is capable of sending and receiving information. The controller 11 also comprises a data storage 36 in which a logic 37 is stored. As used herein, "logic" refers to (i) logic implemented as computer instructions and/or data within one or more computer processes and/or (ii) logic implemented in electronic circuitry. A processor 38 is in operative communication with the data storage 36. The processor 38 executes the logic 37 in order to perform the functions of the controller 11.

Figure 4:
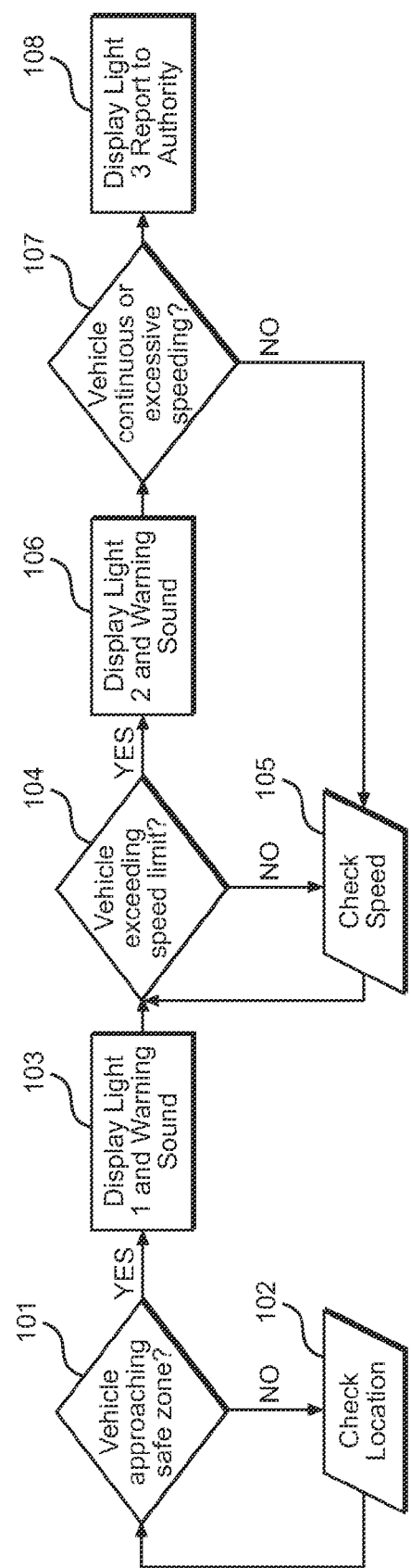
FIG. 4 shows a flowchart of the speed monitoring function performed by the controller of the safety alert system.

Referring now to FIG. 4, a flowchart of the speed monitoring function performed by the controller of the safety alert system is shown. In the first step, the controller actively checks 101 whether the vehicle is approaching a section of roadway with a lower speed limit, i.e. a safe zone. If the vehicle is not approaching a safe zone, the controller continues to monitor the vehicle's speed and location 102. The controller can determine the location of the vehicle by communication with a transmitter via the transceiver and by utilizing the GPS and RFID. The transceiver also checks for when the vehicle is approaching a transmitter that is disposed along the roadway that supplies speed limit information to the controller via the transceiver. The controller continues this loop until the vehicle enters an area with a reduced speed limit, i.e. a safe zone. If the vehicle receives data from the transmitter indicating proximity to a safe zone, the controller emits a warning noise 103 via the speakers.

While in a safe zone, the controller continues to monitor 104 the vehicle's speed. If the vehicle exceeds the safe zone speed limit, the controller will illuminate the first indicator light and emit a second warning sound 106 via the speakers. The controller then continues to monitor 105 the vehicle speed. If the vehicle's speed exceeds the safe zone limit by a threshold amount and/or the vehicle's speed exceeds the safe zone limit for a sustained period of time 107, the controller illuminates 108 the third indicator light. The controller can then also transmits vehicle identification and speed information 108 via the transceiver to the appropriate authority. The time period required to trigger the third indicator light can be established by the administrators of the network hub from which the transmitters draw the speed limit information or pre-programmed into the controller system itself. In one embodiment of the invention, the controller also transmits information 108, such as the vehicle identification, current location, and speed, via the transceiver to the third party agencies such as, for example, department of motor vehicles or to local law enforcement for the state in which the section of road on which the driver is travelling is located.

Figure 5:
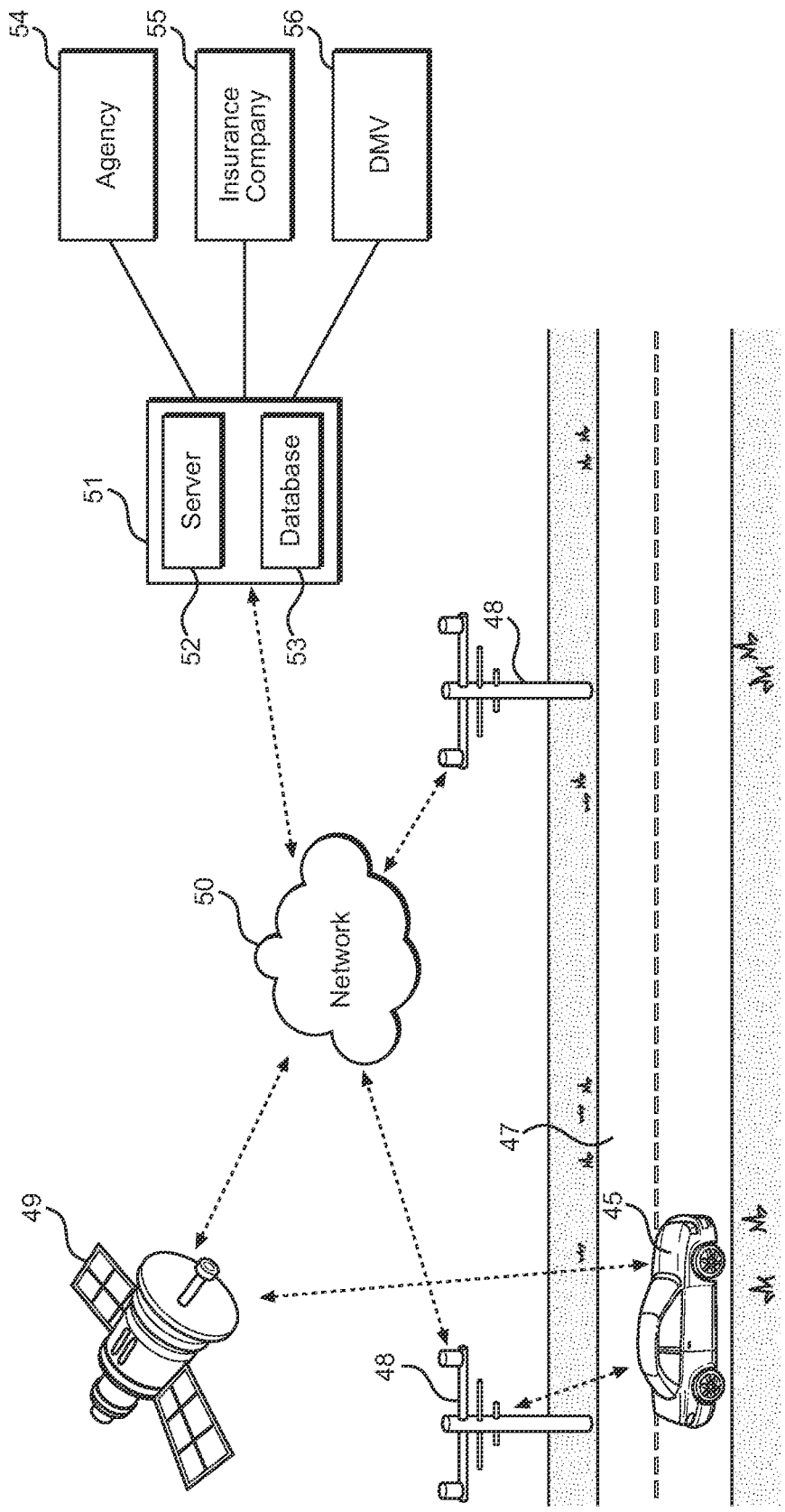
FIG. 5 shows a diagram of the safety alert system and associated transmitter and communication network.

Referring now to FIG. 5, a diagram of the safety alert system and associated transmitter and communication network. As a vehicle 45 having the controller disposed therein travels along a roadway 47, the controller maintains wireless communication with a series of transmitters 48 that are disposed along the roadway 47. In the depicted embodiment of the present invention, the transmitters 48 are dedicated structures. However, in alternative embodiments of the present invention, the transmitters 48 are integrated into existing roadway infrastructure, such as being integrated into the roadway 47 itself or mounted on speed limit signs, traffic lights, or other existing structures that convey roadway information to vehicle operators. The transmitters 48 can be placed by relevant authorities in order to delineate the boundaries of a section of the roadway 47 having a reduced speed limit, as compared to the average speed limit for the roadway 47, or simply be used to delineate sections of the roadway 47 at which the individuals or organizations placing the transmitters 48 desire to have additional speed-related enforcement.

The transmitters 48 comprise wireless transceivers that relay information regarding speed limit from an information hub 51 to the vehicle 45. The information hub 51 comprises a database 53 on which information such as vehicle identification information and speed limit data is stored. The hub 51 further comprises a server 52 that is adapted to send and receive information to and from a communications network 50. The transmitters 48 are also adapted to read the RFID signal emitted by the controller 11 and relay the identifying information to the information hub 51.

The hub 51 is connected to the communications network 50 and is configured to provide information to the transmitters 48 and the controller 11 via the communications network 50, as well as receive information from the transmitters 48 and the controller 11 via the communications network 50. The communications network 50 is a wireless communication network, such as a cellular telecommunication network or any other private or public electronic data network. The server 51 is in communication with the database 53, which may be used to store various information, such as vehicle data, driver identification data, speed limit data, and other such data. It should be understood that the means for communicating data to and from the controller 11 is not limited to the transmission methods discussed herein, but may use any form of electromagnetic communication suitable for communication with an existing wireless network. In a preferred embodiment, the controller passively emits an RFID signal, which is detectable by the transmitters 48. When a vehicle approaches the section of the roadway 47 delineated by the transmitters 48, the transmitters 48 receiver the RFID signal, identify the vehicle, and send the speed limit information to the controller within the vehicle 45. The controller then illuminates the first indicator light to indicate that the vehicle is approaching a safe zone with a monitored speed limit. The speed limit can also be displayed by the controller on display screen, so that the driver of the vehicle may have a constant reminder of the specific speed limit, in addition to the visual indicator indicating the relative speed of the vehicle 45 as compared to the speed limit.

When the vehicle 45 travels at speeds over the safe zone speed limit that exceed a threshold value, the controller transmits its location data via the GPS receiver to the satellite 49 to the network 50, where it is then received by the server 52 of the information hub 51, and stored on the database 53. The controller 11 also transmits vehicle speed information to the transmitter via the wireless transceiver 35. The transmitter 48 relays the speed information via its own transceiver to the server 52 and stored on the database 53. The information regarding the vehicle's speed and location may then be transmitted via the server 52 to the appropriate authorities, such as the appropriate department of motor vehicles (DMV) 56, an insurance company 55, or another agency 54. The appropriate authorities may then take corrective action. For example, a government agency may receive information from the controller 11 regarding a vehicles speed and if they deem the driver to be dangerous, they may send the appropriate authority to intercept the vehicle and/or issue a citation.

In one embodiment, the system only provides the location of the vehicle 45 to the database 53 if the registered owner or vehicle itself is in violation of a law or regulation. The system may be applied to many types of violations such as expired insurance, expired registration, outstanding traffic tickets, and so on. For example, if a violation is reported to the authorities that contains information regarding a vehicle with the safety alert system equipped, an agency may interact with the database 53 via the server 52 and change the status of the vehicle with which the controller is equipped to reflect a violation, such as driving with expired registration or insurance. Once the controller is updated, the controller can provide notice to the driver.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle safety monitor system, comprising:
   a server;
   a communications network;
   a transmitter including a first wireless transceiver in communication with the communications network via the server;
   a database in communication with the server, the database configured to store posted speed limit information of a section of a roadway;
   a controller in communication with the transmitter via the first wireless transceiver, the controller comprising:
      a sensor configured to detect a current speed of the vehicle;
      a second wireless transceiver in communication with the communications network;
      a processor;
      a non-transitory computer readable medium operatively connected to the processor;
      a logic stored in the non-transitory computer readable medium that, when executed by the processor, causes the controller to monitor the speed of the vehicle, by at least:
      detecting the transmitter;
      communicating with the server and database over the communications network;
      retrieving a current speed of a vehicle from the vehicle;
      retrieving a posted speed limit corresponding to a posted speed limit of a section of a roadway from the database;
      matching the retrieved posted speed limit with the retrieved current speed limit of the vehicle;
      if the current speed is less than or equal to the posted speed limit, activating a first mode;
      if the current speed is greater than the posted speed limit, activating a second mode;
      if the current speed is greater than the posted speed limit for a predetermined time period, activating the third mode;
      wherein the first mode activates a first alert;
      wherein the second mode activates a second alert;
      wherein the third mode activates a third alert and transmits vehicle identification information of the vehicle including the current speed to a third party;
   a digital display disposed on a front surface, the digital display configured to display the current speed limit of the vehicle;
   a first plurality of indicator lights disposed on the front surface, the first plurality of indicator lights including a first light having a first color, a second light having a second color, a third light having a third color;
   the first light configured to remain illuminated;
   the second light configured to illuminate if the current speed limit is greater than the posted speed limit plus the threshold value; and
   the third light configured to illuminate if the current speed is greater than the posted speed limit for the predetermined time period;
   a second plurality of indicator lights disposed on a rear surface, the second plurality of indicator lights including a first light having a first color and a second light having a second color.

2. The vehicle safety monitor system of claim 1, wherein the controller further comprises:
   a power source;
   a speaker;
   a battery indicator light;
   an attachment point disposed on a rear surface.

3. The vehicle safety monitor system of claim 2, wherein the controller further comprises:
   vehicle identification information including vehicle registration and insurance information; and
   a machine readable barcode, including the vehicle identification information.

4. The vehicle safety system of claim 1, wherein the transmitter includes a plurality of transmitters arranged in one or more groups, each group defining a section of a roadway.

5. The vehicle safety system of claim 1, wherein the controller includes a radio frequency identification chip configured to communicate with the first wireless transceiver by transmitting a distinct signal via the second wireless transceiver;
   wherein the transmitter is configured to identify the radio frequency identification chip via the first wireless transceiver.

6. The vehicle safety system of claim 1, wherein the sensor is in communication with an onboard computer speedometer of the vehicle and is configured to detect the current speed of the vehicle using the onboard computer speedometer.

7. The vehicle safety system of claim 1, wherein the sensor is configured to detect the current speed of the vehicle using a global positioning system.

8. The vehicle safety system of claim 1, wherein the third mode further transmits the vehicle identification information to an agency via the communications network.

9. A method of alerting drivers and third parties of a speeding vehicle when the vehicle is speeding in a section of a roadway, comprising the steps of:
   detecting a transmitter positioned on a section of a roadway;
   communicating with a server and database over a communications network;
   retrieving a current speed of a vehicle from the vehicle;
   retrieving a posted speed limit corresponding to a posted speed limit of a section of a roadway from the database;
   matching the retrieved posted speed limit with the retrieved current speed limit of the vehicle;
   if the current speed is less than or equal to the posted speed limit, activating a first mode;
   if the current speed is greater than the posted speed limit, activating a second mode;
   if the current speed is greater than the posted speed limit for a predetermined time period, activating a third mode;
   wherein the first mode activates a first alert;
   wherein the second mode activates a second alert;
   wherein the third mode activates a third alert and transmits vehicle identification information of the vehicle including the current speed to a third party;

activating a first plurality of indicator lights disposed on a front surface, the first plurality of indicator lights including a first light having a first color, a second light having a second color, a third light having a third color;

if the current speed is less than or equal to the posted speed limit, activating the first light;

if the current speed is greater than the posted speed limit, activating the second light;

if the current speed is greater than the posted speed limit for a predetermined time period, activating the third light;

activating a second plurality of indicator lights disposed on a rear surface, the second plurality of indicator lights including a first light having a first color and a second light having a second color.

10. The method of claim 9, wherein the current speed of the vehicle is retrieved from an on-board computer speedometer of the vehicle.

11. The method of claim 9, wherein the current speed of the vehicle is retrieved from a global positioning system receiver.

12. The method of claim 9, wherein the first alert, the second alert, and the third alert comprise an audible alert and a visual alert.

\* \* \* \* \*